United States Patent
Brahmi et al.

(10) Patent No.: US 9,949,281 B2
(45) Date of Patent: Apr. 17, 2018

(54) METHOD AND RADIO NODE FOR MANAGING RESOURCES FOR D2D DISCOVERY IN AN AD-HOC RADIO COMMUNICATION NETWORK

(71) Applicant: Telefonaktiebolaget L M Ericsson (publ), Stockholm (SE)

(72) Inventors: Nadia Brahmi, Aachen (DE); Gabor Fodor, Hässelby (SE)

(73) Assignee: TELEFONAKTIEBOLAGET L M ERICSSON (PUBL), STOCKHOLM (SE)

(*) Notice: Subject to any disclaimer, the term of this patent is extended or adjusted under 35 U.S.C. 154(b) by 72 days.

(21) Appl. No.: 14/900,484

(22) PCT Filed: Jun. 27, 2013

(86) PCT No.: PCT/SE2013/050798
§ 371 (c)(1),
(2) Date: Dec. 21, 2015

(87) PCT Pub. No.: WO2014/209181
PCT Pub. Date: Dec. 31, 2014

(65) Prior Publication Data
US 2016/0135201 A1    May 12, 2016

(51) Int. Cl.
*H04W 72/08* (2009.01)
*H04W 76/02* (2009.01)
(Continued)

(52) U.S. Cl.
CPC .......... *H04W 72/085* (2013.01); *H04L 5/006* (2013.01); *H04W 4/06* (2013.01); *H04W 8/005* (2013.01);
(Continued)

(58) Field of Classification Search
None
See application file for complete search history.

(56) References Cited

U.S. PATENT DOCUMENTS

2007/0274275 A1* 11/2007 Laroia ............... H04W 40/244
370/338
2009/0285174 A1   11/2009 Haga et al.
(Continued)

FOREIGN PATENT DOCUMENTS

EP           1811794 A1    7/2007

*Primary Examiner* — Derrick W Ferris
*Assistant Examiner* — Jay L Vogel
(74) *Attorney, Agent, or Firm* — Sage Patent Group (57) ABSTRACT

A method and a radio node (110) for managing resources for D2D discovery in an ad-hoc radio communication munication network (100). The radio node (110) receives beacon signals from a number of further radio nodes (120, 130, 140). A respective beacon signal includes values indicating power received at the respective further radio node (120, 130, 140) for each resource of the amount of resources. The radio node (110) calculates, for each respective further radio node (120, 130, 140), values of SINR based on the values indicating power received at the respective further radio node (120, 130, 140). The radio node (110) selects at least one resource out of the amount of resources to increase number of discovering further radio nodes (120, 30, 140) and/or to increase average SINRover the further radio nodes (120, 130, 40). The radio node (110) broadcasts a further beacon signal on the selected at least one resource.

12 Claims, 3 Drawing Sheets

(51) Int. Cl.
*H04L 5/00* (2006.01)
*H04W 8/00* (2009.01)
*H04W 4/06* (2009.01)
*H04W 72/02* (2009.01)
*H04W 84/18* (2009.01)

(52) U.S. Cl.
CPC ......... *H04W 72/02* (2013.01); *H04W 76/023* (2013.01); *H04W 84/18* (2013.01)

(56) References Cited

U.S. PATENT DOCUMENTS

| | | |
|---|---|---|
| 2010/0054188 A1 | 3/2010 | Matsumoto et al. |
| 2010/0272077 A1 | 10/2010 | van Rensburg et al. |
| 2011/0076958 A1 | 3/2011 | Fukushi et al. |
| 2012/0243433 A1 | 9/2012 | Kneckt et al. |
| 2012/0287807 A1* | 11/2012 | Yamasaki ............ H04W 40/12 370/252 |
| 2013/0039323 A1 | 2/2013 | Ohnishi et al. |
| 2013/0128870 A1 | 5/2013 | Jeon et al. |
| 2014/0254401 A1* | 9/2014 | Talwar ................. H04W 24/10 370/252 |
| 2014/0364065 A1* | 12/2014 | Pu ........................ H04W 24/10 455/67.11 |

* cited by examiner

METHOD AND RADIO NODE FOR MANAGING RESOURCES FOR D2D DISCOVERY IN AN AD-HOC RADIO COMMUNICATION NETWORK

TECHNICAL FIELD

Embodiments herein relate to wireless communication systems, such as telecommunication systems. A method and a radio node for managing resources for Device-to-Device discovery in an ad-hoc radio communication network are disclosed.

BACKGROUND

Within the field of telecommunication systems, technologies for creating so called ad-hoc networks have been developed in order to for example simplify network deployment and provide a more dynamic network environment. An ad-hoc network comprises a set of network nodes, such as cellular phones. A network node may join or leave the ad-hoc network for various reasons, such as mobility, coverage conditions and more. In order for the network node to be able to join the ad-hoc network, a joining network node, i.e. a network node that wishes to join the ad-hoc network, is required to be able to discover the ad-hoc network. This means that the ad-hoc network comprises the network nodes that have already joined the ad-hoc network. Moreover, the joining node is required to be able to be discovered by the nodes in the ad-hoc network. This is generally referred to as discovery, and in particular to Device-to-Device (D2D) discovery.

Hence, in ad-hoc networking, D2D discovery refers to a procedure that allows devices in the proximity of each other to detect the presence of one another. Sometimes, D2D discovery may be referred to as neighbor or peer discovery. D2D discovery in ad hoc networks involves an engineering tradeoff between energy efficiency, discovery range, the number of discovered devices and the discovery time. Typically, ad hoc technologies such as Bluetooth deal with this problem by carefully designing measurement and beacon signaling procedures and employing state transitions between energy conserving and active states, e.g. between a beacon detecting state and a beacon transmitting state.

D2D discovery is a well-known and widely used component of many existing wireless technologies, including ad hoc and cellular networks. Apart from Bluetooth, several variants of the IEEE 802.11 standards suite, such as WiFi Direct include technical solutions for device discovery. A key technique used by these standards is to use specially designed so called beacon signals that devices can broadcast and capture, so that nearby devices are able to detect the proximity as well as some characteristics of such beacon broadcasting devices.

Beacon signaling based neighbor device discovery requires that a broadcasting device and a receiving device meet in the time, frequency and code domains. Furthermore, in order for discovery to work, the beacon receiving device is required to be able to decode the information encoded in the beacon signal. In other words, the beacon signal must reach a certain Signal-to-Noise-and-Interference Ratio (SINR) threshold at the receiving device in order for the beacon signal to be detected at the receiving device.

Although D2D discovery for ad hoc networks, using technologies such as Bluetooth, WiFi Direct, has been known for some time, only few techniques have been proposed and built for devices operating in cellular spectrum and using cellular technologies with or without the need for a base station. Hence, in the context of D2D discovery techniques for devices operating in cellular spectrum and using cellular technologies a few shortcomings have been identified.

A first known technique uses random selection of Peer Discovery Resources (PDR), which is a set of resources selected from within the cellular spectrum. The PDRs are dedicated for beacon signaling. With this technique, each beacon broadcasting device randomly selects one PDR, or as many as required for the beacon signal to be broadcast, out of dedicated PDRs within the cellular time-frequency resources. This technique may lead to situations in which multiple devices in the vicinity of each other use colliding PDRs. Such collisions of beacon signals make beacon signals undetectable or not decodable by receiving devices. Thus, D2D discovery by means of the beacon signals becomes difficult or even impossible.

A second known technique uses so called greedy, or opportunistic, selection of PDRs. This means that a device selects a PDR that is not used. When the number of nodes in the ad-hoc network exceeds the number of available discovery resources, all PDRs are being used at a given point in time. In this case, when a new node joins the ad-hoc network, or a device population, the new node selects one PDR for which a distance to the closest peer, or neighbor device, currently using that resource is maximized. This may be expressed by:

$$C(i) = \mathrm{argmax}_k (\min_{j \in N_k} (\|X_i - X_j\|)),$$

where $C(i)$ denotes the selected resource for node-i, and $\|X_i - X_j\|$ denotes the Euclidean distance between node-i and node-j. $N_k$ is the set of the nodes that are assigned to the resource k when node i joined the network. Selecting the resource according to the above formula corresponds to so called greedily picking a resource, sometimes referred to as channel, that produces the best Euclidean separation between the node selecting the peer discovery resource and other peers using the same peer discovery resource. A first noteworthy characteristic of this distance based peer discovery resource selection algorithm is that it requires the capability of performing measurements per peer discovery resource and per neighbor node. A second noteworthy characteristic of the distance based selection objective above is that it involves minimizing the distance to a particular peer. In certain scenarios, alternative techniques of separating PDRs selected by different nodes may be required.

SUMMARY

An object is to improve D2D discovery in an ad-hoc network of the above mentioned kind.

According to an aspect, the object is achieved by a method, performed by a radio node for managing resources D2D discovery in an ad-hoc radio communication network. The ad-hoc radio communication network comprises a number of further radio nodes. The resources comprise an amount of resources that are dedicated for transmission of beacon signals for D2D discovery. The radio node receives beacon signals from the number of further radio nodes. The beacon signals include a respective beacon signal from a respective further radio node of the further radio nodes. The respective beacon signal includes values indicating power received at the respective further radio node for each resource of the amount of resources. The radio node calculates, for each respective further radio node, values of SINR based on the values indicating power received at the respective further radio node. The values of SINR include a respective value of SINR for each resource of the amount of resources. The respective value of SINR is calculated as if said each resource is used by the radio node for broadcasting of beacon signals.

Next, the radio node calculates, for said each resource, a respective number of further radio nodes that are capable of discovering the radio node by comparing the respective value of SINR to a threshold for discovery of the radio node. Each respective number for all resources of the amount of resources are included in a set of numbers indicating further radio nodes that are capable of discovering the radio node.

As another calculation, the radio node calculates, for said each resource, a respective value of average SINR. The respective value of average SINR is determined as an average of each respective value of SINR at each of the further radio nodes over the further radio nodes. Each respective value of average SINR for all resources of the amount of resources are included in a set of values of average SINR.

Subsequently, the radio node selects at least one resource out of the amount of resources. The respective number of further radio nodes for the selected at least one resource is among the greatest of the set of numbers indicating further radio nodes and/or the respective value of average SINR for the selected at least one resource is among the greatest of the set of values of average SINR.

Then, the radio node broadcasts, to the further radio nodes, a further beacon signal on the selected at least one resource.

According to another aspect, the object is achieved by a radio node configured to manage resources for D2D discovery in an ad-hoc radio communication network. The ad-hoc radio communication network comprises a number of further radio nodes. The resources comprise an amount of resources that are dedicated for transmission of beacon signals for D2D discovery. The radio node comprises a processing circuit configured to receive beacon signals from the number of further radio nodes. The beacon signals include a respective beacon signal from a respective further radio node of the further radio nodes. The respective beacon signal includes values indicating power received at the respective further radio node for each resource of the amount of resources. The processing circuit is further configured to calculate, for each respective further radio node, values of SINR based on the values indicating power received at the respective further radio node. The values of SINR include a respective value of SINR for each resource of the amount of resources. The respective value of SINR is calculated as if said each resource is used by the radio node for broadcasting of beacon signals.

Furthermore, the processing circuit is configured to calculate, for said each resource, a respective number of further radio nodes that are capable of discovering the radio node by comparing the respective value of SINR to a threshold for discovery of the radio node. Each respective number for all resources of the amount of resources are included in a set of numbers indicating further radio nodes that are capable of discovering the radio node. The processing circuit is, alternatively or additionally, configured to calculate, for said each resource, a respective value of average SINR. The respective value of average SINR is determined as an average of each respective value of SINR at each of the further radio nodes over the further radio nodes. Each respective value of average SINR for all resources of the amount of resources are included in a set of values of average SINR.

Moreover, the processing circuit is configured to select at least one resource out of the amount of resources. The respective number of further radio nodes for the selected at least one resource is among the greatest of the set of numbers indicating further radio nodes and/or the respective value of average SINR for the selected at least one resource is among the greatest of the set of values of average SINR. The processing circuit is also configured to broadcast, to the further radio nodes, a further beacon signal on the selected at least one resource.

In some first embodiments, the radio node calculates, for said each resource, a respective number of further radio nodes that are capable of discovering the radio node by comparing the respective value of SINR to a threshold for discovery of the radio node. Each respective number for all resources of the amount of resources are included in a set of numbers indicating further radio nodes that are capable of discovering the radio node. Subsequently, the radio node selects at least one resource out of the amount of resources. The respective number of further radio nodes for the selected at least one resource is among the greatest of the set of numbers indicating further radio nodes. Thus, the radio node may have selected the at least one resource for which the radio node is discovered by the greatest, or almost greatest, number of further radio nodes, i.e. neighbouring radio nodes.

In some second embodiments, for example as an alternative calculation, the radio node calculates, for said each resource, a respective value of average SINR. The respective value of average SINR is determined as an average of each respective value of SINR at each of the further radio nodes over the further radio nodes. Each respective value of average SINR for all resources of the amount of resources are included in a set of values of average SINR. Subsequently, the radio node selects at least one resource out of the amount of resources. The respective value of average SINR for the selected at least one resource is among the greatest of the set of values of average SINR. Thus, the radio node may have selected the at least one resource for which the average SINR over the further radio nodes, i.e. neighbouring radio nodes, is the greatest, or almost greatest.

As a result, alternative techniques for distributing PDRs are provided.

Advantageously, no network assistance for the selection of the at least one resource is required thanks to that each radio node in the ad-hoc radio communication network applies the same method for selection of the at least one resource as described according to embodiments herein. Some of the proposed methods achieve high spatial resource utilizations which translate into gain in the number of discovered devices. Other proposed methods achieve increased average SINR which translate into improved radio conditions for beacons signals. Thus, D2D discovery may be improved.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Throughout the following description similar reference numerals have been used to denote similar elements, network nodes, parts, items or features, when applicable. In the Figures, features that appear in some embodiments are indicated by dashed lines.

Figure 1:
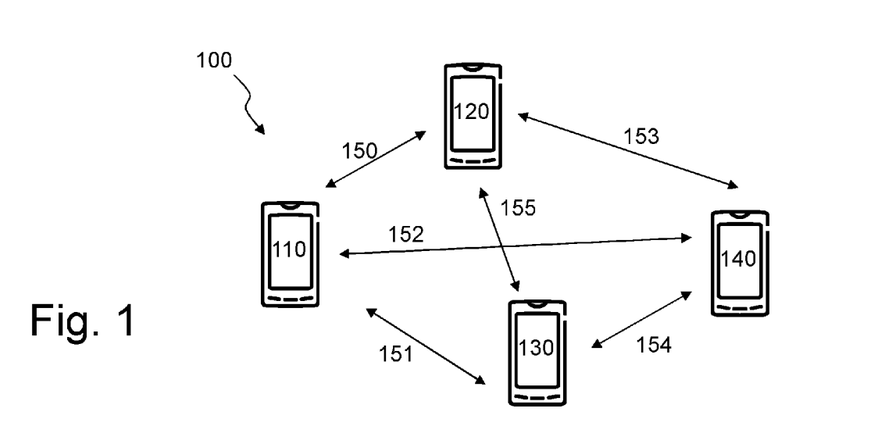
FIG. 1 is a schematic overview of an exemplifying ad-hoc radio communication network in which embodiments herein may be implemented.

FIG. 1 depicts an exemplifying ad-hoc radio communication network 100 in which embodiments herein may be implemented. In this example, the radio communication network 100 is a Long Term Evolution (LTE) system. In other examples, the radio communication network may be any Third Generation Partnership Project (3GPP) cellular communication system, such as a Wideband Code Division Multiple Access (WCDMA) network, a Global System for Mobile communication (GSM network), etc. or any evolutions thereof. The ad-hoc radio communication network 100 may, or may not, be within coverage of a radio network node (not shown). The radio network node may be a radio base station, an eNB, a radio network controller, a base station controller or the like.

A radio node 110 may be located in the vicinity of the ad-hoc communication network 100. As will be explained below the radio node 110 may wish to join the ad-hoc radio communication network 100.

The ad-hoc radio communication network 100 comprises a number of further radio nodes 120, 130, 140. As used herein, the term "radio node" may refer to an evolved Node B (eNB), a control node controlling one or more Remote Radio Units (RRUs), a radio base station, an access point or the like. As used herein, the term "radio node" may refer to a user equipment, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc.

In some examples, the radio node 110 may be referred to as a first radio node and each of the further radio nodes 120, 130, 140 may be referred to as a second radio node 120, a third radio node 130 and a fourth radio node 140, respectively.

As an example, the first radio node 110 may be about to join the ad-hoc radio communication network 100. Therefore, the first radio node 110 may send and receive 150, 151, 152 beacon signals, or beacons for short, in communication with the second radio node 120, the third radio node 130 and/or the fourth radio node 140.

As a further example, the second, third and fourth radio nodes 120, 130, 140 may have already joined the ad-hoc radio communication network 100. Therefore, in order to discover the first radio node 110 and to be discovered by the first radio node 110, the second, third and fourth radio nodes 120, 130, 140 may additionally send and receive 153, 154 beacons. Moreover, sending and receiving 155 of beacons between the second and third radio node 120, 130, 140 are also shown. In essence, this means that the beacon signals are transmittable between any of the radio node 110 and the further radio nodes 120, 130, 140.

The first, second, third and fourth radio nodes 110, 120, 130, 140 are assumed to be randomly located, or placed, in some geographical area within which D2D communication is deemed possible.

Each of the first, second, third and fourth radio nodes 110, 120, 130, 140 is aware of a default set of resources that are dedicated for transmission of beacon signals for D2D discovery. For example, the default set of resources may be preconfigured in each radio node 110, 120, 130, 140. Each radio node 110, 120, 130, 140 may use any PDR of the default set of resources for broadcasting of beacon signals. Such pre-configuration may be achieved by a network node, e.g. an eNB of an LTE system, a base station or the like, that allocates and broadcasts the default set of resources, aka a set of PDRs, based on the density of the UEs. Here, density of the UEs refers to how sparse or compactly the UEs are located from each other.

In certain scenarios, the default set of resources may be based on which method shall be used for selection of a particular PDR for beacon signaling. For example, the set of PDRs that may be used according to embodiments herein may for example be different from a further predefined set of PDRs that may be used when the first and/or second technique, described in the background section, is implemented. The selection of PDRs for broadcasting of a beacon signal and the contents of the beacon signal addresses the inherent tradeoff between the complexity of measurements that need to be performed by the radio node 110 selecting the PDR and reducing the interference level in the ad-hoc radio communication network 100. Furthermore, the information broadcasted in the beacon signal helps other nodes of the ad-hoc radio communication network 100 to select their PDR to broadcast their respective beacon signals.

As used herein, a resource may refer to a certain coding of a beacon signal and/or a time frame and/or a frequency range in which the beacon signal is transmitted. In some examples, a resource may refer to one or more physical resource blocks (PRB) which are used when transmitting the beacon signal. In more detail, a PRB may be in the form of orthogonal frequency division multiplexing (OFDM) PHY resource blocks (PRB). The term "physical resource block" is known from 3GPP terminology relating to e.g. Long Term Evolution Systems.

All of the first, second, third and fourth radio nodes 110, 120, 130, 140 may preferably use the same transmission power level to broadcast their respective beacon signal. The transmission power level may be set either by a network node and/or a default transmit power level may have been preconfigured in each radio node 110, 120, 130, 140.

The radio node 110, 120, 130, 140 may be globally synchronized using an external device, e.g. a WCDMA base station, an LTE eNB or a common external timing source, e.g. satellites of the Global Positioning System (GPS).

Furthermore, each radio node 110, 120, 130, 140 may be discovered if a beacon signal received from it reaches or exceeds a threshold value for discovery, which threshold value may for example specify a Signal-to-Interference-and-Noise ratio (SINR). The threshold value for discovery may depend on receiver sensitivity, employed modulation and coding scheme of the beacon signal and other factors. The threshold value for discovery may be predefined to e.g. 1 dB. A higher threshold value imply better conditions in terms of chance of correctly receiving the beacon signal, but the higher the threshold value is the shorter a so called discovery range may be. The discovery range refers to a maximum distance between any two radio nodes at which the two radio nodes still are able to discover each other.

According to the embodiments herein decentralized methods, associated measurements and supporting signaling mechanisms for autonomous D2D discovery in ad-hoc networks are provided. Advantageously, the methods maximize, or at least increase, resource utilization, such as in terms of minimizing, or at least reducing, the number of resources used as PDRs. Moreover, a number of discovered devices may be increased thanks to the methods described herein.

According to embodiments herein the radio node 110 may transmit beacon signals in certain predetermined frames and only in some peer discovery resources selected as described herein. Furthermore each node measures on each resource the received signals. These measurements may be used to identify the less used resources in their neighborhood and hence select one of them to reduce the inferences or to inform the neighboring nodes about the used resources so that they can adaptively adjust the peer discovery resources in which they may transmit beacons.

Figure 2:
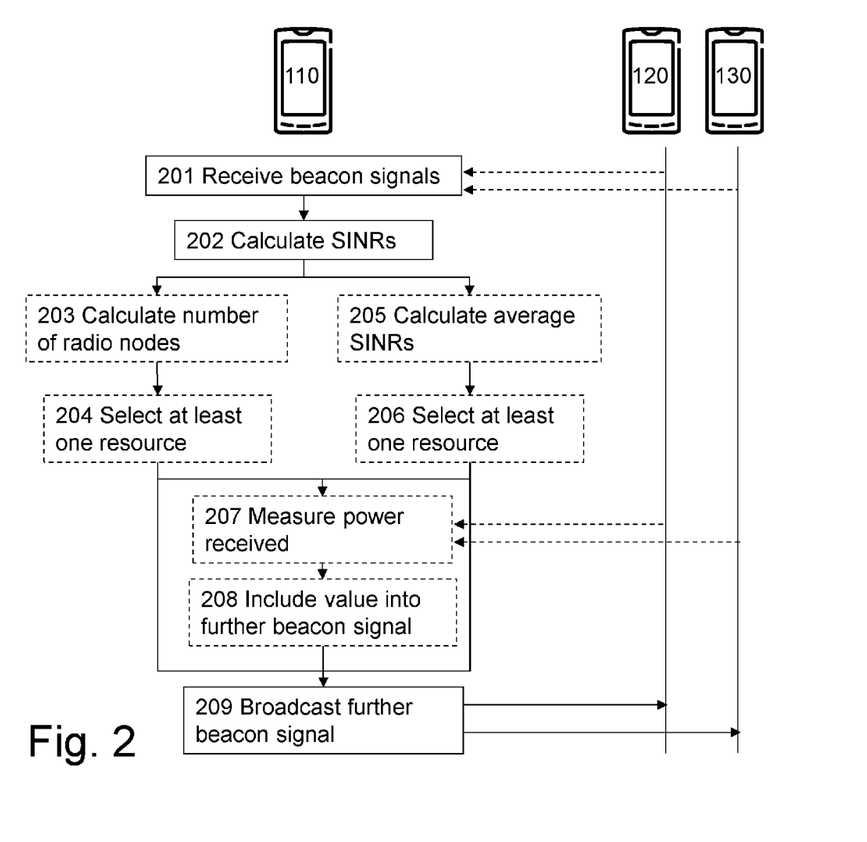
FIG. 2 is a schematic, combined signaling scheme and flowchart illustrating embodiments of the methods when performed in the radio communication system according to FIG. 1.

FIG. 2 illustrates an exemplifying method for managing resources for D2D discovery when implemented in the radio communication network 100 of FIG. 1. As mentioned, the resources comprise an amount of resources that are dedicated for transmission of beacon signals for D2D discovery. The amount of resources may be less than or equal to the number of further radio nodes 120, 130, 140.

The following actions may be performed in any suitable order.

Action 201

In order for the radio node 110 to become aware of power received at its neighbours, i.e. the further radio nodes 120, 130, 140, the radio node 110 receives a respective beacon signal from each of the further radio nodes 120, 130, 140. The respective beacon signal includes values indicating power received at the respective further radio node 120, 130, 140 for each resource of the amount of resources. The values will be used in action 202.

Action 202

Since the radio node 110 now is aware of power received at its neighbours, the radio node 110 calculates, for each respective further radio node 120, 130, 140, values of SINR based on the values indicating power received at the respective further radio node 120, 130, 140. The values of SINR include a respective value of SINR for each resource of the amount of resources. The respective value of SINR is calculated as if said each resource is used by the radio node 110 for broadcasting of beacon signals. Hence, the radio node 110 provides estimates of SINR for each possible choice of resource.

Expressed differently, the radio node 110 may estimate SINR, based on beacons, i.e. the values indicating power received included in the beacon, which would be received by each of its neighbors when using each peer discovery resource. The beacons are received from the radio node's 110 neighbors during a listening phase as in action 207. Assuming that nodes use the same transmission power for discovery beacons a node-i is able to estimate the path loss to a distant node-j and so deduces its approximate SINR on each peer discovery resource. Channel reciprocity is assumed for the estimation of path loss.

For example, the SINR of node-i received by a neighboring node-j on resource-k as calculated in node-i is determined by:

$$SINR_k^i(j) = \frac{S_k^i(j)}{\sum_{l \in N_k(j), l \neq j} S_k^l(j) + N_k} \quad \text{(Eq. 1)}$$

Eq. 1 expresses action 202 while using mathematical formulas. In this example, the radio node 110 is the node Node-i.

$S_k^i(j)$ denotes the signal power received by a radio node j from a neighbour radio node i on resource k. As an example, the signal power may be given by a Received Signal Strength Indicator (RSSI).

$N_k$ is a set of radio nodes assigned to the resource k before radio node i attempts to join, or has joined, the ad-hoc radio communication network 100.

Actions 203 and 204 or actions 205 and 206 are performed in the following. The actions 203 and 204 illustrate the first embodiments and the actions 205 and 206 illustrate the second embodiments. Briefly, the radio node 110 selects at least one resource out of the amount of resources to increase number of discovering further radio nodes 120, 130, 140 according to the first embodiments or to increase average SINR over the further radio nodes 120, 130, 140 according to the second embodiments.

Action 203

The radio node 110 calculates, for said each resource, a respective number of further radio nodes 120, 130, 140 that are capable of discovering the radio node 110 by comparing the respective value of SINR to a threshold for discovery of the radio node 110. Each respective number for all resources of the amount of resources are included in a set of numbers indicating further radio nodes 120, 130, 140 that are capable of discovering the radio node 110. This action is similar to action 203.

Action 204

The radio node 110 selects at least one resource out of the amount of resources. For the selected at least one resource, the respective number of further radio nodes 120, 130, 140 is among the greatest of the set of numbers indicating further radio nodes 120, 130, 140. Hence, the amount of further radio nodes 120, 130, 140 that discovers the radio node 110 is at least almost maximized. At least almost maximized may be given by a criterion that the respective number of further radio nodes 120, 130, 140 of the selected at least one resource may be above a first threshold value indicating a desired number of discovering further radio nodes 120, 130, 140.

When selecting a PDR, i.e. the at least one resource, the first embodiments aims at 'at least almost maximizing' the number of the discovering radio nodes i.e. the number of further radio nodes that successfully decode the radio node's 110 beacon signal. For this purpose the radio node 110 that joins the network 100 has to estimate for each PDR the number of the nodes that would receive the beacon with an SINR above the threshold for discovery when using this resource to send the beaconing signals on.

The first embodiments may be summarized using formulas as follows. First, an indicator function is defined by:

$$\Lambda_x = \begin{cases} 1 & \text{if } x \text{ true} \\ 0 & \text{if } x \text{ false} \end{cases} \quad \text{(Eq. 2)}$$

And considering that $SINR_k^i(j)$ is the SINR of Node-i received by a Neighbor-j when using the resource-k, the Node-i selects the PDR (i) such that:

$$PDR(i) = \underset{k}{\operatorname{argmax}} \sum \Lambda_{\{SINR_k^i(j) > \gamma^{th}\}} \quad \text{(Eq. 3)}$$

where $\gamma^{th}$ denotes the threshold for discovery, or the discovery threshold. The summation of Eq. 3 includes all nodes that use Resource-k.

Now actions 205 and 206 according to the second embodiments will be described.

Action 205

In order to find the resource which at least almost maximizes the average SINR at the further radio nodes 120, 130, 140, the radio node 110 calculates, for each resource, a respective value of average SINR. The respective value of average SINR is determined as an average of each respective value of SINR at each of the further radio nodes 120, 130, 140 over the further radio nodes. Each respective value of average SINR for all resources of the amount of resources are included in a set of values of average SINR. In action 206, the radio node 110 will select a resource based on its respective value of average SINR.

Expressed differently, the calculation of the values of average SINR received by further radio nodes 120, 130, 140 for each possible choice of resource for the radio node 110 is used in action 206 to select the at least one resource to actually be used for broadcasting the beacon signals of radio node 110.

$$PDR(i) = \underset{k}{\operatorname{argmax}}(SINR_{AVEk}^i),$$

wherein $SINR_{AVE_k}^i$ denotes average SINR on Resource-k over all nodes that use Resource-k.

This means that the selected at least one resource may be given by:

$$PDR(i) = \underset{k}{\operatorname{argmax}}\left(\frac{\sum_{j \in N_k} SINR_k^i(j)}{\operatorname{sum}(j \in N_k)}\right) \quad \text{(Eq. 4)}$$

The same notion as in Eq. 1 has been used when applicable. "arg max over k" denotes that k shall be selected such as to maximize the average SINR given by the expression $$\frac{\sum_{j \in N_k} SINR_k^i(j)}{\operatorname{sum}(j \in N_k)}.$$

Action 206

The radio node 110 selects at least one resource out of the amount of resources. For the selected at least one resource, the respective value of average SINR is among the greatest of the set of values of average SINR. Hence, average SINR over the further radio nodes 120, 130, 140 is at least almost maximized. At least almost maximized may be given by a criterion that the respective value of average SINR of the selected at least one resource may be above a second threshold value indicating a desired average SINR for the further radio nodes 120, 130, 140.

The embodiments including actions 205 and 206 may be referred to as embodiments relating to average SINR, or sometimes maximizing, or increasing, average SINR.

Expressed somewhat differently, with the second embodiments it may be desired to select the resource autonomously by the radio node 110, i.e. a newly joining device, to at least almost maximize, or increase, the average SINR received by the further radio nodes 120, 130, 140, e.g. any neighboring devices.

By achieving higher average SINR, i.e. averaging over the receiving neighbors, the radio node 110 increases its chance of being discovered by its neighbors.

Irrespectively of whether actions 203 and 204 or actions 205 and 206 have been performed one or more of the following actions may be performed.

Action 207

In order to enable each radio node to take a decision, i.e. select which PDR to use, in a distributed manner, the radio nodes may cooperate by periodically exchanging local measurements performed individually. To this end, each device already present in the ad-hoc network 100 and continuously transmitting a beacon measures the detected energy on each peer discovery resource. These measurements, such as the total received signal strength per PDR and/or the SINR per detected neighbor and per PDR, are included into the beacon and periodically reported to all the further radio nodes 120, 130, 140.

Thus, the radio node 110 may measure power received at the radio node 110 for each resource of the amount of resources, to obtain values indicating power received at the radio node 110. This is referred to as "listening phase" herein.

In some examples, only obtained values exceeding a threshold are included in the beacon signal. Hence, the radio node 110 increases its local knowledge within its neighborhood, for example within a so called two-hop neighborhood.

Action 208

In order for the radio node 110 to inform the further radio nodes 120, 130, 140 about its local measurements, i.e. the obtained values, the radio node 110 may include the values into a further beacon signal which will be broadcast in action 209.

Action 209

The radio node 110 broadcasts, to the further radio nodes 120, 130, 140, the further beacon signal on the selected at least one resource. Thanks to that the further beacon signal includes the obtained values, the further radio nodes 120, 130, 140 may be informed about radio conditions at the radio node 110, as given by the obtained values. Hence, each of the further radio nodes 120, 130, 140 may apply the first embodiments and/or the second embodiments by use of the values included in the further beacon signal.

Recommendations

In some embodiments, the respective beacon signal may include an indication of at least one resource of the amount of resources that the respective further radio node 120, 130, 140 has determined to be selectable, or non-selectable, as the at least one resource that is selected in action 204. In these embodiments, the radio node 110 may further select, as in action 204, the at least one resource based on the indication. When the indication indicates selectable resources, these selectable resources may be regarded as particularly recommended as being selected as PDRs. In some examples, the indication may include a set of recommended PDRs. In these examples, it may be that the radio node 110 only performs measurements, e.g. action 207, and/or calculations, e.g. action 202, 203 and/or 205 for each resource of the set of recommended PDRs.

Expressed somewhat differently, the radio node 110 may select the discovery resources PDRs based on recommendations from neighboring nodes, i.e. the indication above. For this, the radio node 110 computes, based on beacon signals received from the further radio nodes 120, 130, 140 the received signals, i.e. detected energy, on each PDR. Based on these measurements, it estimates which resources are the most congested and should not be used within a given range, or which resource is less congested and could be used.

The radio node 110 includes the recommendations in its beacons to report them to its neighbors. In turn, these neighbors may forward the recommendations in beacon signals to their neighbors. A new node when joining the network and after collecting information included in all the received beacons during the listening phase aggregates all the recommendations and picks the resource that maximizes the number of the discovering devices.

Re-Selection

Note that the embodiments described in this section may, in addition to the radio node 110, be applied to any one or more of the further radio nodes 120, 130, 140 that already are comprised in the ad-hoc radio communication network 100. These further radio nodes 120, 130, 140 may already use certain PDRs for transmission of their beacon signals. However, due to mobility or changes in the radio conditions the further radio nodes 120, 130, 140 may need to, or may decide to reselect the PDR they will use in upcoming, i.e. future, Peer Discovery Frames (PDF). Such reselection is triggered by a device when it experiences a total received signal energy, on the PDR that it is currently using for transmitting its own beacons, that is greater than a threshold value for re-selection.

Figure 3:
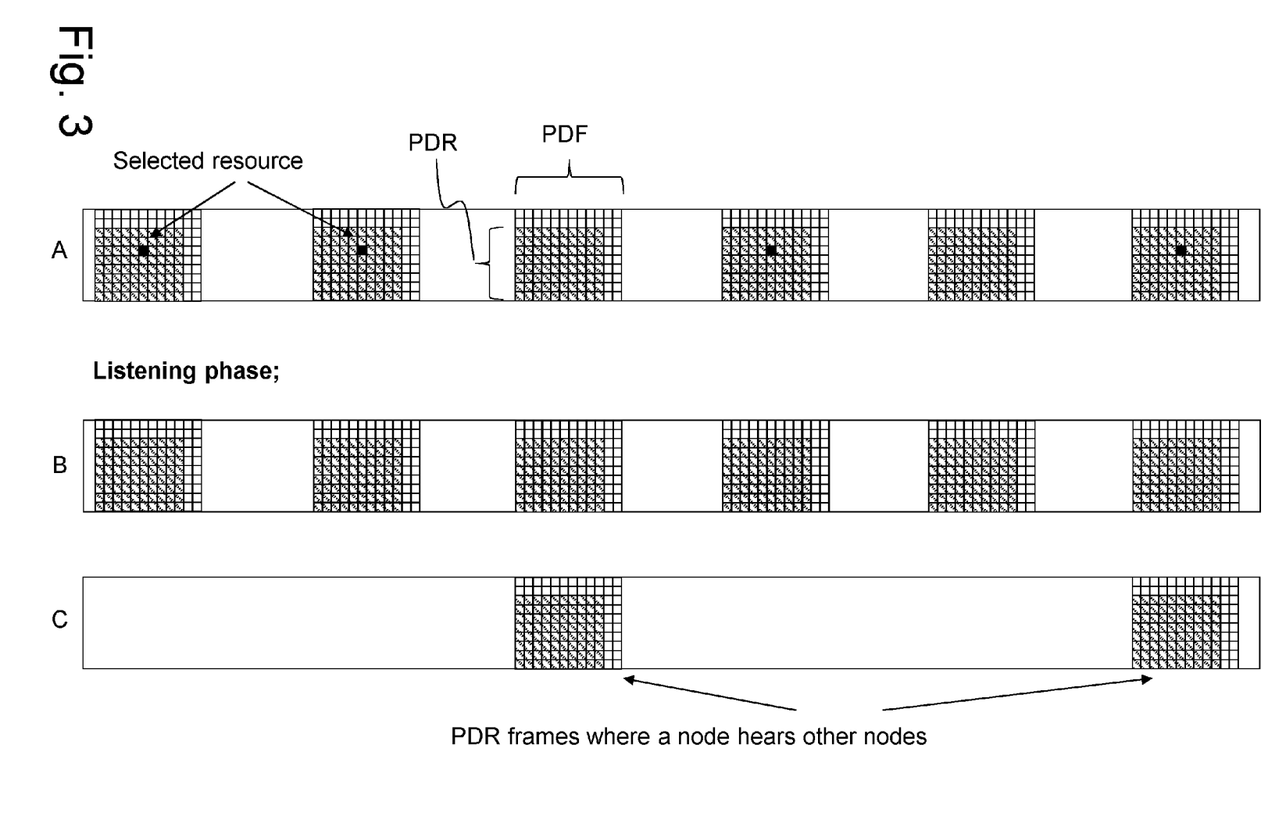
FIG. 3 is a timing scheme illustrating embodiments herein.

FIG. 3 shows Peer Discover Frames (PDF) and Peer Discovery Resources (PDR). PDFs are typically used with a low duty cycle out of all available radio frames, such as OFDM frames or LTE frames of 10 ms. In the example of FIG. 3, there is only two PDFs out of 100 (not shown) radio frames during a 1 s time interval, i.e. 100×10 ms. Within each PDF, a subset of the available OFDM PHY resource blocks (PRBs) is used for peer discovery (beacon signaling) purposes (small black square). In this example, it is assumed that the radio node 110 would transmit a beacon signal for the duration of 1 ms. Notably, FIG. 3 is schematic, number of rows and columns in the frames are merely illustrative, not actual.

Autonomous Peer Discovery

When joining a network (or moving to a new position), such as the ad-hoc communication network 100, a device, such as the radio node 110, may wish to be discovered by other nodes. Therefore, the device may have to select at least one PDR out of the available resources in a Peer Discovery Frame (PDF) to transmit a beacon. If the node also wishes to discover the surrounding devices, it has to listen in the remaining resources to receive the discovery signals from other devices.

In case the number of further radio nodes, exceeds, or is equal to, the amount of resources in the PDF, the radio node 110, which is about to join the ad-hoc network, will have to reuse resources used by one or more of the further radio nodes 120, 130, 140. In such a case, if the radio nodes sharing the same resources keep sending on each Peer Discovery Frame (PDF) they will not be able to detect each other since the radio node 110 cannot detect a beacon signal on a PDR while simultaneously transmitting on that PDR. To overcome this problem, the radio node 110 has to select only some of the frames to broadcast beacon signals in. Instead, the radio node 110 will be in a listening mode (not sending beacon signals) during other PDFs. This could be done for example by setting a certain transmission probability Ptr on each PDF.

At the time of each peer discovery frame, the radio node 110 may "flip a coin", i.e. randomly select out of 2 possible outcomes: listening or broadcast of beacon signal. Hence, broadcast of the beacon signal in that specific peer discovery frame is allowed with a probability Ptr. If the radio node 110 decides to transmit a beacon in that frame, it autonomously selects one peer discovery resource as described in action 204 or 206.

According to embodiments herein, the radio node 110 determines which PDR out of the available ones in the PDF to use when the radio node 110 decides to actually broadcast the beacon signal in action 209 in that particular PDF. Notably, whether or not to actually broadcast the beacon signal may be performed according to the transmission probability mentioned above.

Figure 4:
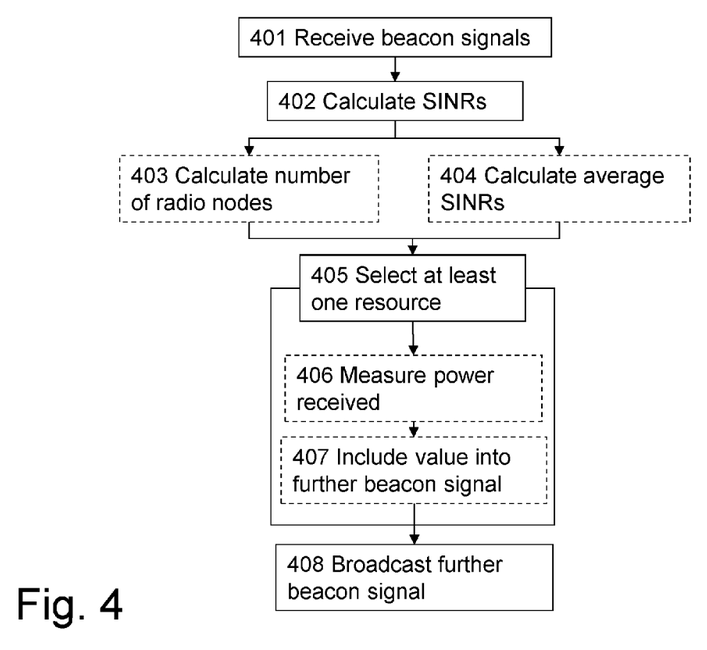
FIG. 4 is a flowchart illustrating embodiments of the method in the radio network node.

In FIG. 4, exemplifying embodiments of the method, performed by the radio node 110 of FIG. 1, is shown. Thus, the radio node 110 performs a method for managing resources for D2D discovery in an ad-hoc radio communication network 100.

As mentioned, the ad-hoc radio communication network 100 comprises a number of further radio nodes 120, 130, 140. The resources comprise an amount of resources that are dedicated for transmission of beacon signals for D2D discovery.

As mentioned, the amount of resources may be less than or equal to the number of further radio nodes 120, 130, 140.

The following actions may be performed in any suitable order.

Action 401

The radio node 110 receives beacon signals from the number of further radio nodes 120, 130, 140. The beacon signals include a respective beacon signal from a respective further radio node 120, 130, 140 of the further radio nodes 120, 130, 140. The respective beacon signal includes values indicating power received at the respective further radio node 120, 130, 140 for each resource of the amount of resources. This action is similar to action 201.

Action 402

The radio node 110 calculates, for each respective further radio node 120, 130, 140, values of SINR based on the values indicating power received at the respective further radio node 120, 130, 140. The values of SINR include a respective value of SINR for each resource of the amount of resources. The respective value of SINR is calculated as if said each resource is used by the radio node 110 for broadcasting of beacon signals. This action is similar to action 202.

Action 403 or 404 is performed in the following.

Action 403

The radio node 110 calculates, for said each resource, a respective number of further radio nodes 120, 130, 140 that are capable of discovering the radio node 110 by comparing the respective value of SINR to a threshold for discovery of the radio node 110. Each respective number for all resources of the amount of resources are included in a set of numbers indicating further radio nodes 120, 130, 140 that are capable of discovering the radio node 110. This action is similar to action 203.

Action 404

The radio node 110 calculates, for said each resource, a respective value of average SINR. The respective value of average SINR is determined as an average of each respective value of SINR at each of the further radio nodes 120, 130, 140 over the further radio nodes, wherein each respective value of average SINR for all resources of the amount of resources are included in a set of values of average SINR. This action is similar to action 205.

Action 405

The radio node 110 selects at least one resource out of the amount of resources. This action is similar to action 204 or 206.

In some examples, the respective number of further radio nodes 120, 130, 140 for the selected at least one resource is among the greatest of the set of numbers indicating further radio nodes 120, 130, 140. The respective number of further radio nodes 120, 130, 140 of the selected at least one resource may be above a first threshold value indicating a desired number of discovering further radio nodes 120, 130, 140. In this example, action 405 is similar to action 204.

In some alternative examples, the respective value of average SINR for the selected at least one resource is among the greatest of the set of values of average SINR. The respective value of average SINR of the selected at least one resource may be above a second threshold value indicating a desired average SINR for the further radio nodes 120, 130, 140. In this example, action 405 is similar to action 206.

Action 406

The radio node 110 may measure power received at the radio node 110 for each resource of the amount of resources, to obtain values indicating power received at the radio node 110. This action is similar to action 207.

Action 407

The radio node 110 may include the values into the further beacon signal. This action is similar to action 208.

Action 408

The radio node 110 broadcasts, to the further radio nodes 120, 130, 140, a further beacon signal on the selected at least one resource. This action is similar to action 209.

In some embodiments, the respective beacon signal may include an indication of at least one resource of the amount of resources that the respective further radio node 120, 130, 140 has determined to be selectable, or non-selectable, as at least one resource. In these embodiments, the selecting of the at least one resource further is based on the indication. See sections "recommendations" above.

Figure 5:
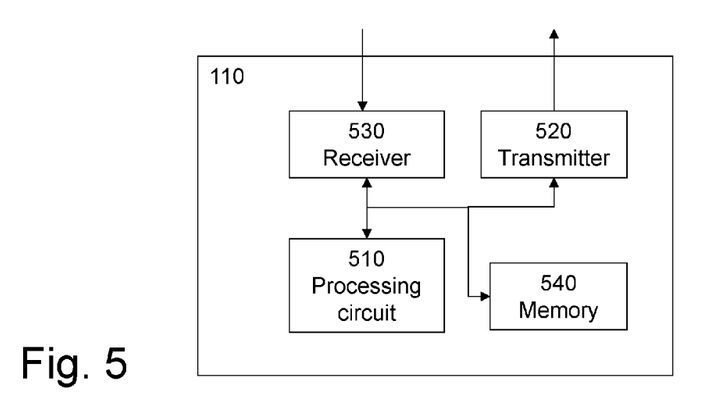
FIG. 5 is a block diagram illustrating embodiments of the radio network node.

With reference to FIG. 5, a schematic block diagram of embodiments of the radio node 110 is shown. The radio node 110 is configured to perform the methods in FIG. 2 and/or 4. Thus, the radio node 110 configured to manage resources for D2D discovery in an ad-hoc radio communication network 100.

As mentioned, the ad-hoc radio communication network 100 comprises a number of further radio nodes 120, 130, 140. The resources comprise an amount of resources that are dedicated for transmission of beacon signals for D2D discovery.

Again, the amount of resources may be less than or equal to the number of further radio nodes 120, 130, 140.

The radio node 110 comprises a processing circuit 510 configured to receive beacon signals from the number of further radio nodes 120, 130, 140. The beacon signals include a respective beacon signal from a respective further radio node 120, 130, 140 of the further radio nodes 120, 130, 140. The respective beacon signal includes values indicating power received at the respective further radio node 120, 130, 140 for each resource of the amount of resources. The processing circuit 510 is further configured to calculate, for each respective further radio node 120, 130, 140, values of SINR based on the values indicating power received at the respective further radio node 120, 130, 140. The values of SINR include a respective value of SINR for each resource of the amount of resources. The respective value of SINR is calculated as if said each resource is used by the radio node 110 for broadcasting of beacon signals.

Furthermore, the processing circuit 510 is configured to calculate, for said each resource, a respective number of further radio nodes 120, 130, 140 that are capable of discovering the radio node 110 by comparing the respective value of SINR to a threshold for discovery of the radio node 110, wherein each respective number for all resources of the amount of resources are included in a set of numbers indicating further radio nodes 120, 130, 140 that are capable of discovering the radio node 110. Alternatively, the processing circuit 510 is configured to calculate, for said each resource, a respective value of average SINR. The respective value of average SINR is determined as an average of each respective value of SINR at each of the further radio nodes 120, 130, 140 over the further radio nodes. Each respective value of average SINR for all resources of the amount of resources are included in a set of values of average SINR.

Moreover, the processing circuit 510 is configured to select at least one resource out of the amount of resources. As a first option, the respective number of further radio nodes 120, 130, 140 for the selected at least one resource is among the greatest of the set of numbers indicating further radio nodes 120, 130, 140. The respective number of further radio nodes 120, 130, 140 of the selected at least one resource may be above a first threshold value indicating a desired number of discovering further radio nodes 120, 130, 140.

As a second option, the respective value of average SINR for the selected at least one resource is among the greatest of the set of values of average SINR. The respective value of average SINR of the selected at least one resource may be above a second threshold value indicating a desired average SINR for the further radio nodes 120, 130, 140.

The processing circuit 510 is also configured to broadcast, to the further radio nodes 120, 130, 140, a further beacon signal on the selected at least one resource. The processing circuit 510 may further be configured to measure power received at the radio node 110 for each resource of the amount of resources, to obtain values indicating power received at the radio node 110, and to include the values into the further beacon signal.

The processing circuit 510 may be a processing unit, a processor, an application specific integrated circuit (ASIC), a field-programmable gate array (FPGA) or the like. As an example, a processor, an ASIC, an FPGA or the like may comprise one or more processor kernels, or processor cores.

In some embodiments, the respective beacon signal includes an indication of at least one resource of the amount of resources that the respective further radio node 120, 130, 140 has determined to be selectable, or non-selectable, as at least one resource. The processing circuit 510 further is configured to select the at least one resource based on the indication. Again reference is made to section "recommendations" above.

The radio node 110 further comprises a transmitter 520, which may be configured to send one or more beacon signals, measurement values, parameters, messages or the like as described herein.

The radio node 110 further comprises a receiver 530, which may be configured to receive one or more beacon signals, measurement values, parameters, messages or the like as described herein.

The radio node 110 further comprises a memory 540 for storing software to be executed by, for example, the processing circuit. The software may comprise instructions to enable the processing circuit to perform the method in the radio node 110 as described above in conjunction with FIG. 2 and/or 6. The memory may be a hard disk, a magnetic storage medium, a portable computer diskette or disc, flash memory, random access memory (RAM) or the like. Furthermore, the memory may be an internal register memory of a processor.

As used herein, the terms "number", "value" may be any kind of digit, such as binary, real, imaginary or rational number or the like. Moreover, "number", "value" may be one or more characters, such as a letter or a string of letters. Further, "number", "value" may also be represented by a bit string.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a radio node, for managing resources for Device-to-Device (D2D) discovery in an ad-hoc radio communication network comprising a plurality of further radio nodes; wherein the method comprises:
    receiving, from each respective further radio node, a broadcast beacon signal including a plurality of values indicating power received, at the respective further radio node each value corresponding to a particular resource of a plurality of resources dedicated for broadcast beacon signals;
    calculating, for each respective further radio node a plurality of values of Signal-to-Noise-and-Interference Ratio (SINR) corresponding to the plurality of values indicating power received at the respective further radio node, each SINR value corresponding to a particular resource of the plurality of resources dedicated for broadcast beacon signals, each SINR being calculated as if the particular resource is used by the radio node for broadcasting of beacon signals;
    wherein the method further comprises one of:
    calculating, for each particular resource of the plurality of resources dedicated for broadcast beacon signals, a respective number of further radio nodes that are capable of discovering the radio node by comparing the calculated values of SINR associated with the particular resource to a threshold for discovery of the radio node, wherein each calculated number of further radio nodes is included in a set of numbers indicating further radio nodes that are capable of discovering the radio node;
    and calculating, for each particular resource of the plurality of resources dedicated for broadcast beacon signals, a value of average SINR based on an average of SINR values corresponding to the particular resource that were calculated for the plurality of further radio nodes, wherein each calculated value of average SINR is included in a set of values of average SINR;
    wherein the method further comprises:
    selecting at least one resource of the plurality of resources dedicated for broadcast beacon signals, based on one of: the calculated number of further radio nodes for the selected at least one resource is among the greatest of the set of numbers indicating further radio nodes, and the calculated value of average SINR for the selected at least one resource is among the greatest of the set of values of average SINR;
    and broadcasting, to the further radio nodes, a further broadcast beacon signal on the selected at least one resource.

2. The method of claim 1, comprising: measuring power received at the radio node for each resource of the plurality of resources dedicated for broadcast beacon signals, to obtain values indicating power received at the radio node; and including the values into the further broadcast beacon signal.

3. The method of claim 1, wherein each broadcast beacon signal includes an indication of at least one resource, of the plurality of resources dedicated for broadcast beacon signals, that the respective further radio node has determined to be selectable, or non-selectable for broadcasting a further broadcast beacon signal, wherein the selecting of the at least one resource further is based on the indication.

4. The method of claim 1, wherein the calculated number of further radio nodes of the selected at least one resource is above a first threshold value indicating a desired number of discovering further radio nodes.

5. The method of claim 1, wherein the calculated value of average SINR of the selected at least one resource is above a second threshold value indicating a desired average SINR for the further radio nodes.

6. The method of claim 1, wherein the plurality of resources dedicated for broadcast beacon signals is less than or equal to the number of further radio nodes.

7. A radio node configured to manage resources for Device-to-Device (D2D) discovery in an ad-hoc radio communication network comprising a plurality of further radio nodes, wherein the radio node comprises a processing circuit configured to:
    receive, from each respective further radio nodes, a broadcast beacon signal including a plurality of values indicating power received, at the respective further radio node, each value corresponding plurality of resources dedicated for broadcast beacon signals;
    calculate, for each respective further radio node, a plurality of values of Signal-to-Noise-and-Interference Ratio (SINR) corresponding to the plurality of values indicating power received, at the respective further radio node, each SINR value corresponding to a particular resource of the plurality of resources dedicated for broadcast beacon signals, each SINR being calculated as if the particular resource is used by the radio node for broadcasting of beacon signals;
    wherein the processing circuit further is configured to:
    calculate, for each particular resource of the plurality of resources dedicated for broadcast beacon signals, a respective number of further radio nodes that are capable of discovering the radio node by comparing the calculated values of SINR associated with the particular resource to a threshold for discovery of the radio node, wherein each calculated number of further radio nodes is included in a set of numbers indicating further radio nodes that are capable of discovering the radio node;

or calculate, for each particular resource of the plurality of resources dedicated for broadcast beacon signals, a value of average SINR based on an average of SINR values corresponding to the particular resource that were calculated for the plurality of further radio nodes, wherein each calculated value of average SINR is included in a set of values of average SINR;

wherein the processing circuit further is configured to:

select at least one resource of the plurality of resources dedicated for broadcast beacon signals, based on one of: the calculated number of further radio nodes for the selected at least one resource is among the greatest of the set of numbers indicating further radio nodes, and the calculated value of average SINR for the selected at least one resource is among the greatest of the set of values of average SINR; and broadcast, to the further radio nodes a further broadcast beacon signal on the selected at least one resource.

8. The radio node of claim 7, wherein the processing circuit further is configured to: measure power received at the radio node for each resource of the plurality of resources dedicated for broadcast beacon signals, to obtain values indicating power received at the radio node; and include the values in the further broadcast beacon signal.

9. The radio node of claim 7, wherein each broadcast beacon signal includes an indication of at least one resource, of the plurality of resources dedicated for broadcast beacon signals, that the respective further radio node has determined to be selectable, or non-selectable for broadcasting a further broadcast beacon signal, wherein the processing circuit further is configured to select the at least one resource based on the indication.

10. The radio node of claim 7, wherein the calculated number of further radio nodes of the selected at least one resource is above a first threshold value indicating a desired number of discovering further radio nodes.

11. The radio node of claim 7, wherein the calculated value of average SINR of the selected at least one resource is above a second threshold value indicating a desired average SINR for the further radio nodes.

12. The radio node of claim 7, wherein the plurality of resources dedicated for broadcast beacon signals is less than or equal to the number of further radio nodes.

* * * * *